United States Patent
Cavicchioli et al.

(10) Patent No.: US 7,217,213 B2
(45) Date of Patent: May 15, 2007

(54) ADDITIVE GEARSHIFT WITH DIFFERENTIAL GEARS

(76) Inventors: Stefano Cavicchioli, B.ta Mollarbrunatto, 23, 10040 Rubiana (IT); Carlo Cavicchioli, via Abegg, 2/C, 10050 Borgone Susa (IT)

(*) Notice: Subject to any disclaimer, the term of this patent is extended or adjusted under 35 U.S.C. 154(b) by 62 days.

(21) Appl. No.: 10/502,532

(22) PCT Filed: Jun. 16, 2003

(86) PCT No.: PCT/IT03/00373

§ 371 (c)(1),
(2), (4) Date: Jul. 26, 2004

(87) PCT Pub. No.: WO2004/097259

PCT Pub. Date: Nov. 11, 2004

(65) Prior Publication Data

US 2005/0101427 A1    May 12, 2005

(51) Int. Cl.
*F16H 37/08* (2006.01)

(52) U.S. Cl. .................... 475/198; 475/330; 74/665 A; 74/665 R; 192/12 R

(58) Field of Classification Search ................ 475/198, 475/330, 269, 293, 306, 307; 74/665 A, 74/665 B, 665 R, 423; 192/48.8
See application file for complete search history.

(56) References Cited

U.S. PATENT DOCUMENTS

| | | | |
|---|---|---|---|
| 2,924,991 A * | 2/1960 | Whiting | 475/7 |
| 3,572,167 A * | 3/1971 | Bosko et al. | 475/218 |
| 4,022,083 A * | 5/1977 | Pollak-Banda et al. | 74/665 B |
| 4,106,603 A * | 8/1978 | Walter | 192/85 AB |
| 4,700,589 A * | 10/1987 | Coronel | 475/6 |
| 4,783,023 A * | 11/1988 | Jupe | 244/6 |
| 5,009,621 A * | 4/1991 | Bankstahl et al. | 440/75 |
| 5,259,823 A | 11/1993 | Coronel | |
| 5,662,009 A * | 9/1997 | Palmer | 74/810.1 |
| 6,712,734 B1 * | 3/2004 | Loeffler | 477/5 |
| 6,895,835 B2 * | 5/2005 | Cordeiro | 74/665 A |
| 2003/0069103 A1 * | 4/2003 | Ibamoto et al. | 475/5 |

FOREIGN PATENT DOCUMENTS

FR    2813368 A1    3/2002

* cited by examiner

*Primary Examiner*—David D. Le
(74) *Attorney, Agent, or Firm*—Ronald E. Greigg

(57) ABSTRACT

This invention is a mechanical gearbox for every vehicle or machinery that needs one. It works on the grounds of the differential gear as a way to obtain mechanical addition or subtraction of the motion of two different shafts. Inside this mechanism an input-shaft-motion subdivision take place over other different shafts, which speeds are recombined together by differential gears, returning over an output-shaft a wide-range of selectable speeds with their proportional torque (transmission ratios).

6 Claims, 4 Drawing Sheets

ADDITIVE GEARSHIFT WITH DIFFERENTIAL GEARS

BACKGROUND OF THE INVENTION

Basically there are 3 main types of gearboxes: manually shifted gearbox with a maximum of about 20 speeds for trucks and 6 for cars; gearbox with planetary gear sets; and continuously variable transmission (CVT).

BRIEF SUMMARY OF THE DISCLOSURE

This invention can be catalogued as a MECHANICAL GEARBOX, but compared with the usual gearbox, this one has nearly the advantages of a CVT's (continuously variable ratio transmission) for its high number of obtainable speeds. The speed-range is very wide and the gap between the various speeds can be very small.

The gearbox of the present invention is extremely versatile and can be configured in different ways by small variants in the construction of the gearbox. It is possible to obtain, for example, all forward gears, one reverse gear and all remaining forward gears, more reverse gears, or as many reverse gears as forward gears with the same ratios.

The rotational velocity of the output is selected by engaging or disengaging one or more clutches inside the gearbox, and the procedure is fast without the need of a main friction clutch. A neutral gear is also available.

With a single rotational velocity of the input, the gearbox of the present invention is able to output many speed-levels. The number of speeds depends on the number of differential gears employed, for example, 1 differential=3 speeds; 2 differential=7 speeds; 3 differential=15 speeds; 4 differential=31 speeds; and so on. In this invention, the task of the differential gear is simply to add the speed of two different input shafts rotating in the same direction, and return as an output on a third shaft, the right value of speed with its proportional torque.

BRIEF DESCRIPTION OF THE DRAWINGS

FIG. 3.2 illustrates a simply coding arrangement for controlling the clutches of FIG. 3.1 to obtain various rotational velocities at the output shaft.

FIG. 1 illustrates a prior art differential gearbox used to make additions. A and B are input shafts which rotate in the same direction. The speed of shaft B has been reduced by 50% of that of shaft A by gears R1 and R2. Gear R1 is bored out in the center to allow free passage of the input shaft A through gear R1. Gear R1 is fixed to rotate with the differential gearbox SCD. Two free-wheels RL are mounted on each of input shafts A and B in order to prevent them from rotating in the direction opposite to the normal rotating direction. In the case where one of the two input shafts is stationary and there is a load on the output shaft C, without free-wheels the stationary input shaft would start rotating in the opposite direction and no torque would come from output shaft C.

The rotational velocity of the output shaft C will be exactly the sum of the rotational velocities of shafts A and B, but with an opposite rotating direction. RC are four conical gears. Free-wheels are not absolutely necessary in the invention, they are just one way to solve the problem discussed above.

Figure 2:
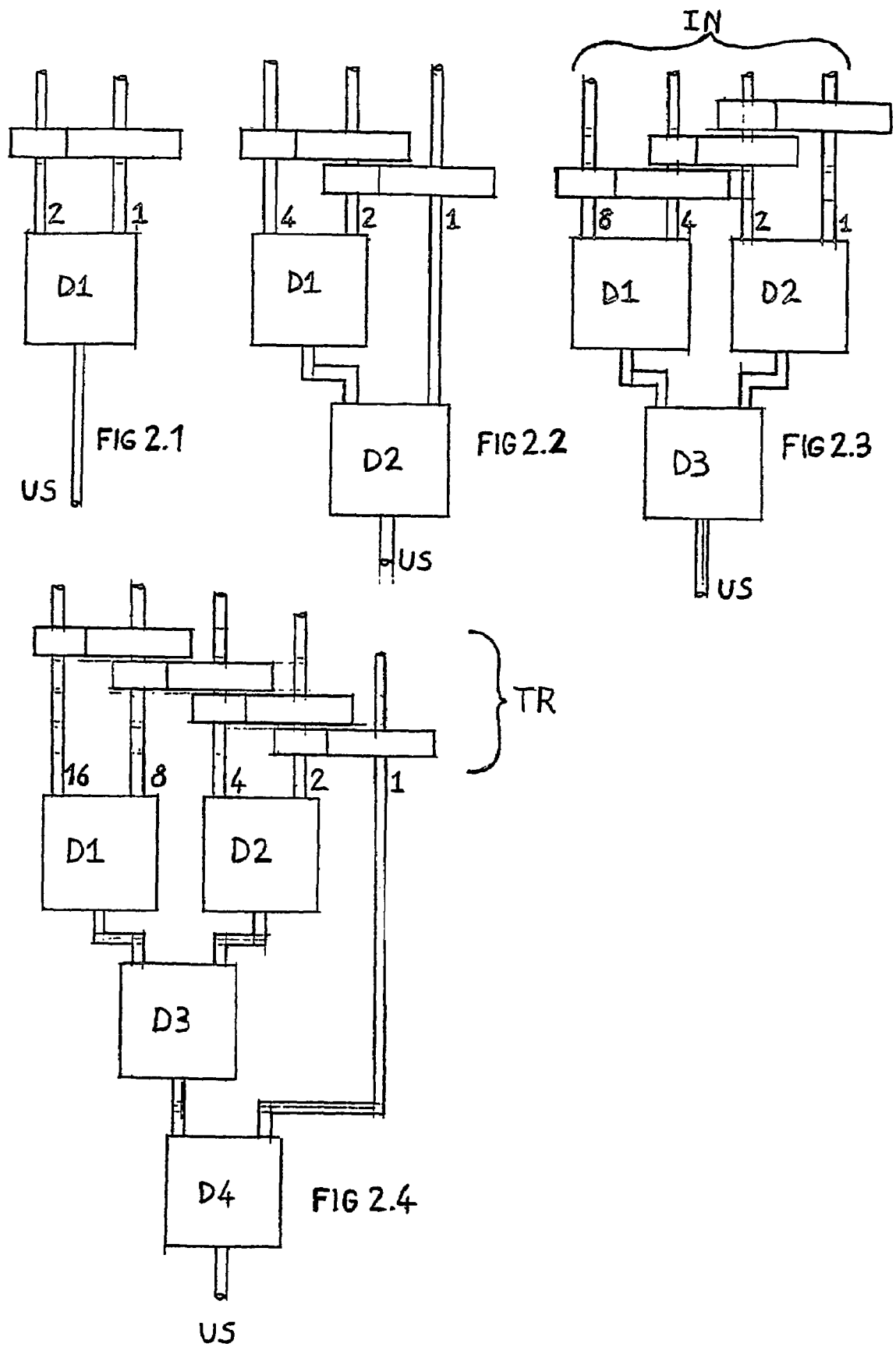
FIGS. 2.1–2.4 illustrate the overall principle of the present invention, including four examples, showing how it would be possible to connect together 1 to 4 differential gears in order to get 3 to 31 different speed ratios.

Now, to an overall principle scheme of the gearbox of the present invention. FIGS. 2.1–2.4 illustrate four examples showing how it would be possible to connect 1 to 4 differential gears in order to get 3 to 31 different speed ratios. As can be seen an important part of the mechanism consists in the gear train TR put before the differential gears. Input shafts to the differential gears come from TR and respectively from left to right, each one rotates at the previous one's half speed. As shown in the drawings, the input shafts connected to the differential gears are identified with the ratio numbers of their relative speeds. The lowest number is 1 which is the lowest speed and which also represents the minimum increase unit of the final output US.

For purposes of explanation and because of its average complexity and number of output speeds, the 3-differential gears and 4-input shafts gearbox shown in FIG. 2.3 will be discussed.

The example of FIG. 2.3 shows a 15 speed gearbox. It provides 15 speeds with ratios from 1 to 15, increasing from speed to speed always by 1. There are four possible input shafts IN to the gearbox. Each input shaft IN is connected to the gear train TR. Where input shaft 8 is driven at 80 rpm by a motor, it is possible for the output shaft US to be driven within a speed range from 10 to 150 rpm, increasing from speed to speed by 10 rpm. The input shaft 1 at the far right is always the minimum increase unit (as previously described). As another example, if an 80 rpm motor is connected to input shaft 1, a speed range from 80 to 1200 rpm, with an increment of 80 rpm, is obtainable from output shaft US.

In order for the invention to operate properly clutches are essential to engage any speed. As FIG. 3.1 shows, every input shaft, between the gear train TR and the differential gear D, is provided with a clutch INN. Clutches block or transmit the motion of the individual input shafts, 8, 4, 2, 1 to the differential gears as needed, and combined together they determine every possible speed. Every single possible combination is assured by a simple table (FIG. 3.2), calculated on the grounds of the binary number system. The table shows clutch states according to the speed to be engaged. On the horizontal axis, there is represented the input shafts; on the vertical axis, there is represented the speed numbers. The black dot indicates motion transmission through the clutch, and the white dot indicates no motion transmission.

Figure 3:
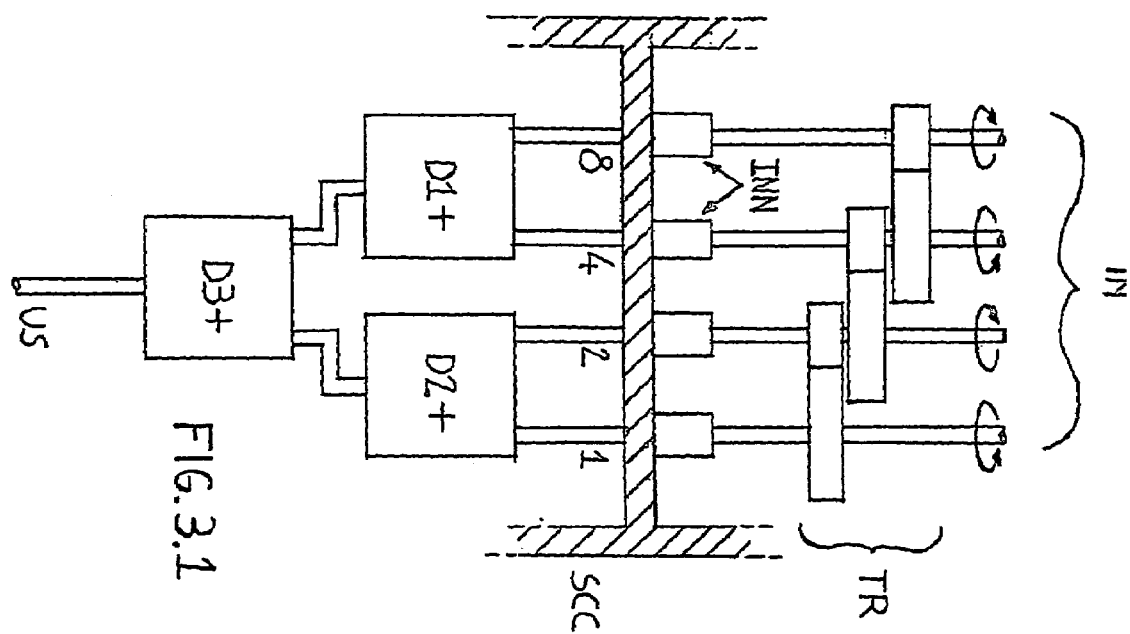
FIG. 3.1 is a schematic illustration of how clutches are employed in the present invention.

The clutches used must be DUAL-ACTION type, that is, they must have two different states: the first one is motion transmission; the second one is no motion transmission and they must also lock, in both rotating directions, the part of the shaft entering into the differential gear and get it in sympathy with the gearbox SCC (FIG. 3.1).

Up to now, all that has been explained is a theoretical explanation of the invention. Its practical realization will be different from some points of view due to the absolute necessity to respect the rotating directions of every single shaft inside the gearbox. It is very important for the right operation of the invention.

According to the rotating directions of the two input shafts in a differential gear used to make additions (as FIG. 1), from the output shaft C, we can get an addition or a subtraction. Now if we shape the gearbox combining additions and subtractions, as output we obtain a speed range including reverse gear. It is also possible to obtain many different reverse gears, but the total number of speeds is 15 plus a neutral gear. The obtainable configurations are various.

From now on, for purposes of explanation, the 3 differential gears inside the gearbox are all addition type ("+" sign in FIG. 3.1). Consequently all forward 15 speeds are available.

Figure 1:
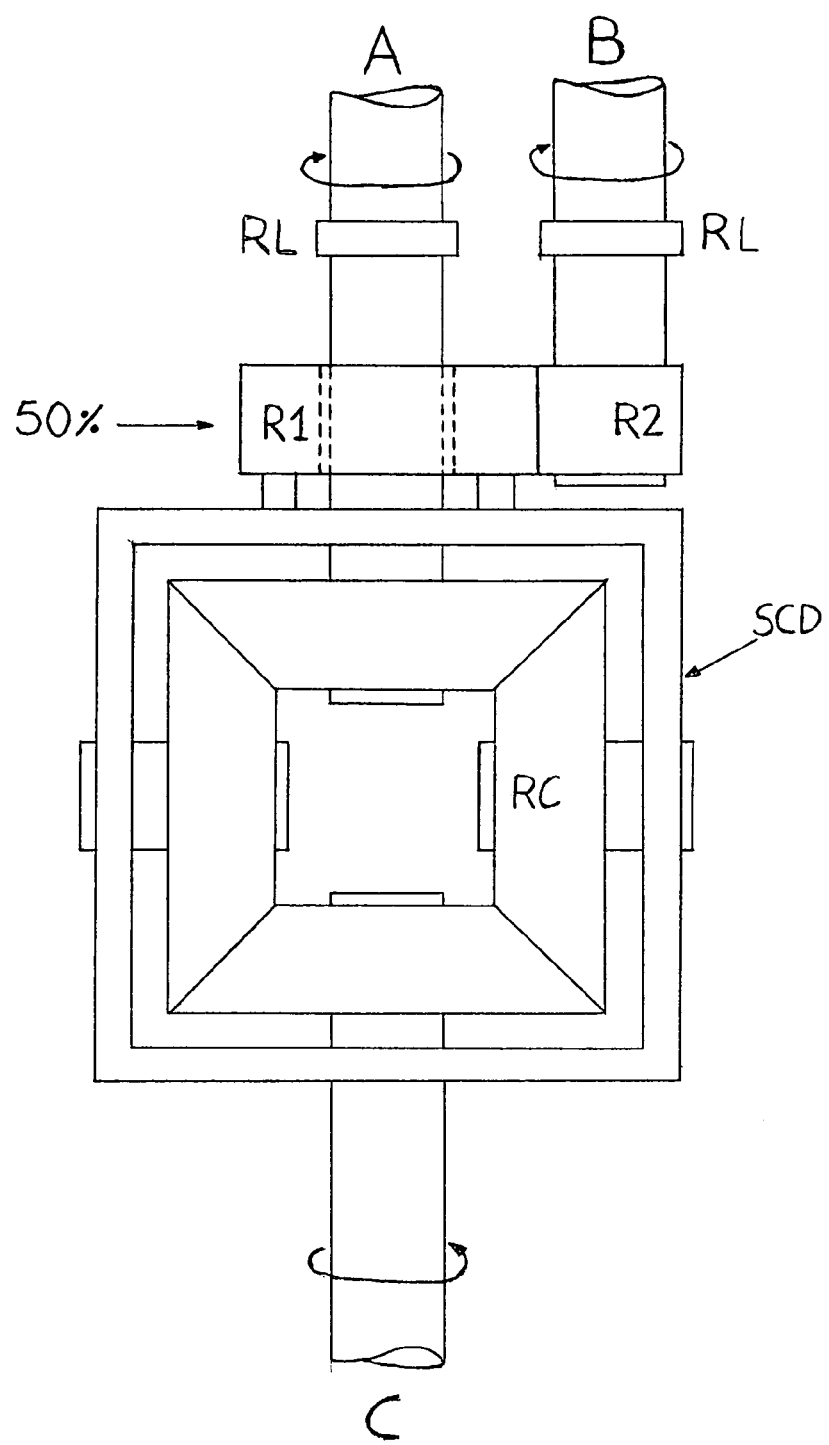
FIG. 1 is a schematic, side view of a differential gearbox.
Figure 4:
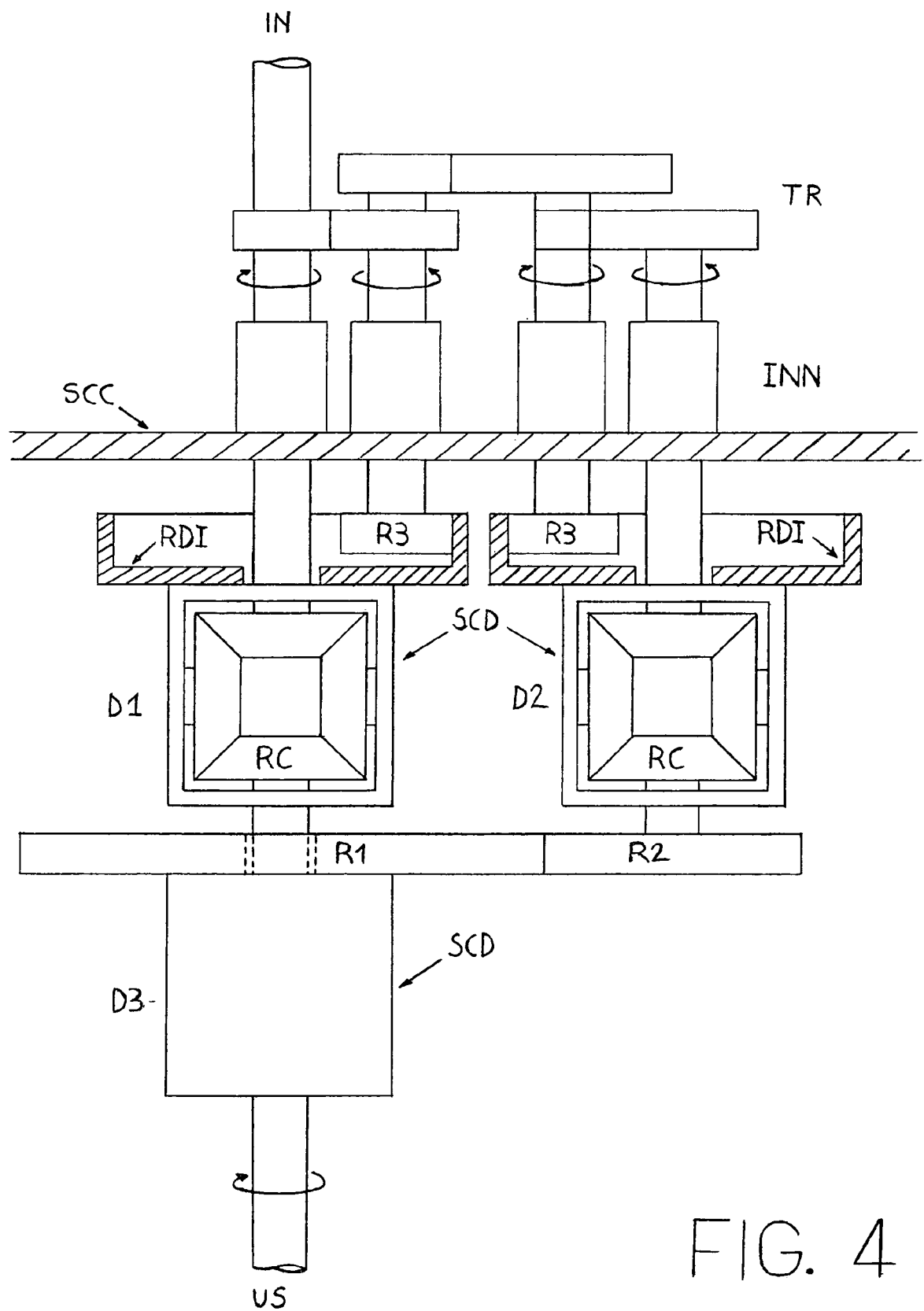
FIG. 4 is a schematic illustration of one embodiment of the invention.

FIG. 4 shows an overall view of an actual mechanism for carrying out the invention. There are some changes compared with FIG. 1 and FIG. 3.1: on the gear train TR and on both internal gears RDI of the differential gears D1 and D2. The reason is simple. In FIG. 1, input shafts A and B rotate in the same direction (obligatory condition to obtain additions). Nevertheless, a 4-shafts gear train as FIG. 3.1 inverts the rotating direction from one shaft to another, so we could never obtain two adjoining shafts with the same rotating direction. That is why the internal gear is necessary: like chains or belts, it does not reverse the motion.

However, using this type of gear, it is not possible to obtain a 50% reduction ratio (as FIG. 1) between R3 and RDI, because of the encumbrance of the shaft going into the differential gear. So, we can obtain a one-third reduction ratio, but the difference must be compensated by changing gear train ratios. On TR, we shall obtain an irregular sequence of different ratios that, if correctly calculated, are equivalent to the theoretical ones in FIG. 3.1.

Gears R1 and R2 have a 50% reduction ratio. R1 is in sympathy with the differential box of D3, and it is bored out in the center to allow free passage to the shaft coming from D1. It is the same with RDI. SCC is the gearbox that clutches INN (not drawn in every detail) are locked to. SCD are differential boxes that gears RDI and R1 are in sympathy with. The differential gear D3 has not been drawn in every detail, but it is exactly identical to D1 and D2. RC are 4 conical gears inside each differential box. US is the final output shaft, and it rotates in the same direction as the input shaft IN.

The foregoing relates to preferred exemplary embodiments of the invention, it being understood that other variants and embodiments thereof are possible within the spirit and scope of the invention, the latter being defined by the appended claims.

The invention claimed is:

1. A transmission system for combining rotational velocities from a first and a second rotating shaft and transmitting a combined sum of the rotational velocities to an output shaft, said first shaft being driven at a rotational velocity V, a gear system interconnecting said first and second rotating shafts and for driving the second rotating shaft at a rotational velocity which is approximately 0.5V, a clutch associated with each of said rotating shafts, each of said clutches having a first state in which rotary motion is transmitted as an output, and a second state in which no rotary motion is transmitted, a first differential gear box receiving the rotary motion outputted by one or more of said clutches, and transmitting rotary motion to said output shaft, said output shaft being driven by said differential gear box at a rotational speed which is approximately equal to: 0, if the clutches associated with said first and second rotating shafts are in said second state: V, if the clutch associated with said first rotating shaft is in said first state and the clutch associated with said second rotating shaft is in said second state: 0.5V, if the clutch associated with said first rotating shaft is in said second state and the clutch associated with said second rotating shaft is in said first state; or 1.5V, if the clutches associated with said first and second rotating shafts are in said first state, including a third rotating shaft, said gear system interconnecting said first, second and third rotating shafts for driving the third rotating shaft at a rotational velocity which is approximately 0.25V, a clutch associated with said third rotating shaft and a second differential gear box, said first differential gear box receiving an output from the clutches associated with the first and second rotating shafts, and the second differential gear box receiving an output from the clutch associated with said third rotating shaft and an output from said first differential gear box, said output shaft being driven by said second differential gear box within a rotational speed range of approximately 0 to 1.75V, depending on the state of said clutches.

2. The transmission system of claim 1, wherein the rotational speed of said output shaft varies within said rotational speed range, according to the state of said clutches, in increments equal to 0.25V.

3. A transmission system for combining rotational velocities from a first and a second rotating shaft and transmitting a combined sum of the rotational velocities to an output shaft, said first shaft being driven at a rotational velocity V, a gear system interconnecting said first and second rotating shafts and for driving the second rotating shaft at a rotational velocity which is approximately 0.5V, a clutch associated with each of said rotating shafts, each of said clutches having a first state in which rotary motion is transmitted as an output, and a second state in which no rotary motion is transmitted, a first differential gear box receiving the rotary motion outputted by one or more of said clutches, and transmitting rotary motion to said output shaft, said output shaft being driven by said differential gear box at a rotational speed which is approximately equal to: 0, if the clutches associated with said first and second rotating shafts are in said second state; V, if the clutch associated with said first rotating shaft is in said first state and the clutch associated with said second rotating shaft is in said second state; 0.5V, if the clutch associated with said first rotating shaft is in said second state and the clutch associated with said second rotating shaft is in said first state; or 1.5V, if the clutches associated with said first and second rotating shafts are in said first state, including a third rotating shaft and a fourth rotating shaft, said gear system interconnecting said first, second, third and forth rotating shafts for driving the third rotating shaft at a rotational velocity which is approximately 0.25V and for driving said fourth rotating shaft at a rotational velocity which is approximately 0.125V, a clutch associated with said third rotating shaft, a clutch associated with said fourth rotating shaft, a second differential gear box and a third differential gear box, said first differential gear box receiving an output from the clutches associated with the first and second rotating shafts, and the second differential gear box receiving an output from the clutch associated with said third and fourth rotating shafts, and said third differential gear box receiving an output from said first and second differential gear boxes, said output shaft being driven by an output of said third differential gear box within a rotational speed range of approximately 0 to 1.875V, depending on the state of said clutches.

4. The transmission system of claim 3, wherein the rotational speed of said output shaft varies within said rotational speed range, according to the state of said clutches, in increments equal to 0.125V.

5. A transmission system for combining rotational velocities from a first and a second rotating shaft and transmitting a combined sum of the rotational velocities to an output shaft, said first shaft being driven at a rotational velocity V, a gear system interconnecting said first and second rotating shafts and for driving the second rotating shaft at a rotational velocity which is approximately 0.5V, a clutch associated with each of said rotating shafts, each of said clutches having a first state in which rotary motion is transmitted as an output, and a second state in which no rotary motion is transmitted, a first differential gear box receiving the rotary motion outputted by one or more of said clutches, and transmitting rotary motion to said output shaft, said output shaft being driven by said differential gear box at a rotational speed which is approximately equal to: 0, if the clutches associated with said first and second rotating shafts are in said second state; V, if the clutch associated with said first rotating shaft is in said first state and the clutch associated with said second rotating shaft is in said second state; 0.5V, if the clutch associated with said first rotating shaft is in said second state and the clutch associated with said second rotating shaft is in said first state; or 1.5V, if the clutches associated with said first and second rotating shafts are in said first state, including a third, a fourth and a fifth rotating shaft, said gear system interconnecting said first, second, third, forth and fifth rotating shafts for driving the third rotating shaft at a rotational velocity which is approximately 0.25V, for driving said fourth rotating shaft at a rotational velocity which is approximately 0.125V, and for driving said fifth rotating shaft at a rotational velocity which is approximately 0.0625V, clutches associated with said third, fourth and fifth rotating shafts, a second, a third, and a fourth differential gear box, said first differential gear box receiving an output from the clutches associated with the first and second rotating shafts, the second differential gear box receiving an output from the clutch associated with said third and fourth rotating shafts, the third differential gear box receiving an output from said first and second differential gear boxes, and the fourth differential gear box receiving an output from said third differential gear box and an output from the clutch associated with said fifth rotating shaft, said output shaft being driven by an output of said fourth differential gear box within a rotational speed range of approximately 0 to 1.94V, depending on the state of said clutches.

6. The transmission system of claim 5, wherein the rotational speed of said output shaft varies within said rotational speed range, according to the state of said clutches, in increments equal to 0.0625V.

* * * * *